US012092620B2

(12) United States Patent
Qin et al.

(10) Patent No.: US 12,092,620 B2
(45) Date of Patent: Sep. 17, 2024

(54) MONOLITHIC MICROFABRICATED GAS ANALYZER AND ENCLOSURE

(71) Applicant: Omniscent Inc., San Jose, CA (US)

(72) Inventors: Yutao Qin, Ann Arbor, MI (US); Yogesh B. Gianchandani, Ann Arbor, MI (US)

(73) Assignee: Omniscent Inc., San Jose, CA (US)

( * ) Notice: Subject to any disclaimer, the term of this patent is extended or adjusted under 35 U.S.C. 154(b) by 322 days.

(21) Appl. No.: 17/623,482

(22) PCT Filed: Jul. 3, 2019

(86) PCT No.: PCT/US2019/040640
§ 371 (c)(1),
(2) Date: Dec. 28, 2021

(87) PCT Pub. No.: WO2021/002874
PCT Pub. Date: Jan. 7, 2021

(65) Prior Publication Data
US 2022/0365043 A1  Nov. 17, 2022

(51) Int. Cl.
*G01N 30/60* (2006.01)
*G01N 30/30* (2006.01)
*G01N 30/40* (2006.01)
*G01N 30/54* (2006.01)
G01N 30/02 (2006.01)

(52) U.S. Cl.
CPC ......... *G01N 30/6095* (2013.01); *G01N 30/30* (2013.01); *G01N 30/40* (2013.01); *G01N 30/54* (2013.01); *G01N 2030/025* (2013.01); *G01N 2030/303* (2013.01); *G01N 2030/3061* (2013.01)

(58) Field of Classification Search
CPC ................. G01N 2030/303; G01N 2030/3061
USPC ....................................................... 73/23.39
See application file for complete search history.

(56) References Cited

U.S. PATENT DOCUMENTS

| 4,935,040 A | 6/1990 | Goedert |
| 5,208,458 A | 5/1993 | Busch et al. |
| 5,827,945 A | 10/1998 | Arnold |

(Continued)

FOREIGN PATENT DOCUMENTS

| EP | 0091928 B1 * | 2/1986 | ............. G01N 30/88 |
| JP | H028215 Y2 * | 2/1990 | |

(Continued)

OTHER PUBLICATIONS

International Search Report and Written Opinion of the ISA issued in PCT/US2019/040640, mailed Sep. 30, 2019; ISA/US, 9 pages.

*Primary Examiner* — Daniel S Larkin
(74) *Attorney, Agent, or Firm* — Harness, Dickey & Pierce, P.L.C.

(57) ABSTRACT

An improved gas chromatography system is presented. The system comprises: an enclosure having an inlet and an outlet, such that the ventilation flow is from the inlet to the outlet; a chamber disposed in the enclosure; a monolithic gas analyzer disposed in the chamber and a temperature control unit disposed in physical contact with the chamber. The monolithic gas analyzer operates to separate and detect molecules from a gas; whereas, the temperature control unit is configured to control temperature inside the chamber.

18 Claims, 8 Drawing Sheets

(56) References Cited

U.S. PATENT DOCUMENTS

| 6,706,091 B1 | 3/2004 | Robinson et al. |
|---|---|---|
| 2004/0016341 A1 | 1/2004 | Tipler et al. |
| 2007/0266857 A1 | 11/2007 | Bentley et al. |
| 2009/0018668 A1 | 1/2009 | Galbraith |
| 2009/0100906 A1 | 4/2009 | Bonne |
| 2010/0005867 A1 | 1/2010 | Doerr |
| 2011/0197655 A1 | 8/2011 | Briscoe et al. |
| 2014/0216134 A1 | 8/2014 | Chou et al. |
| 2017/0234840 A1 | 8/2017 | Broeker |

FOREIGN PATENT DOCUMENTS

| JP | H1019867 A | * | 1/1998 | ............. G01N 30/30 |
|---|---|---|---|---|
| JP | 3191627 U | * | 7/2014 | |

* cited by examiner

MONOLITHIC MICROFABRICATED GAS ANALYZER AND ENCLOSURE

CROSS-REFERENCE TO RELATED APPLICATIONS

This application is a 371 U.S. National Phase of International Application No. PCT/US2019/040640 filed on Jul. 3, 2019. The entire disclosure of the above application is incorporated herein by reference.

FIELD

The present disclosure relates to a monolithic microfabricated gas analyzer and enclosure for the same.

BACKGROUND

A gas chromatograph (GC) is an instrument used to spatiotemporally separate and detect gas phase mixtures by passing sample plugs through a channel (i.e., the column) coated with a functional material (i.e., the stationary phase). The constituents can be identified by the time taken to elute from the column and quantified by the strength of the signal from a gas detector located downstream of the column. In general, many other components are also integral to the operation, such as the preconcentrator that provides sample accumulation during the sampling phase and injection for the analytic separation phase, and the pump that generates the gas flow. In some systems, valves are used to control the timing and direction of the flow. The separation of complex mixtures is sometimes performed using comprehensive two-dimensional GC (2DGC or GC×GC), in which a thermal modulator is used.

Since the widespread adoption of the gas chromatograph by the petroleum industry in the 1950s, its use has been extended to a number of other fields. For example, it is used to examine pollutants, such as polycyclic aromatic hydrocarbons, pesticides, halogenated compounds, etc. Another application is food analysis: coupled with the solid-phase microextraction technique, it is used for the identification and quantification of lipids, drugs, pesticides and carbohydrates. In recent years, biomedical screening has also been performed by this instrument. The analysis of human exhaled biomarkers by the GC provides a non-invasive approach for diagnosis and monitoring of potential diseases. Examples of such biomarkers include nitric oxide related to pulmonary inflammation, and ethane and pentane related to lipid peroxidation.

Customized gas chromatography systems for different applications present many challenges. There remains a need for an improved enclosure arrangement for housing a monolithic gas analyzer and in particular a monolithic gas analyzer intended for outdoor air quality monitoring.

This section provides background information related to the present disclosure which is not necessarily prior art.

SUMMARY

This section provides a general summary of the disclosure, and is not a comprehensive disclosure of its full scope or all of its features.

An improved gas chromatography system is presented. The system comprises: an enclosure having an inlet and an outlet, such that ventilation flow is from the inlet to the outlet; a chamber disposed in the enclosure; a monolithic gas analyzer disposed in the chamber that operates to separate and detect molecules from a gas; and a temperature control unit disposed in physical contact with the chamber and configured to control temperature inside the chamber.

In one embodiment, the monolithic gas analyzer includes: a detector having an inlet to receive the gas; a separation column fluidly coupled to the detector and configured to receive the gas from the detector and operated to separate molecules from the gas; and a preconcentrator fluidly coupled to the separation column. The monolithic gas analyzer may further include a flow rate sensor interposed between the separation column and the preconcentrator.

In an example embodiment, the gas chromatography system further comprises a pump disposed outside of the chamber but inside the enclosure. During a sampling phase, the pump operates to draw the gas into the inlet of the detector, such that the gas passes through the separation column and into the preconcentrator. During an analytic separation phase, the pump operates to reverse the flow of the gas, such that the gas moves from the preconcentrator through the separation column and into the detector. An inlet conduit extends from inside the chamber to the inlet of the enclosure and an outlet conduit extends between the chamber and the pump.

In the example embodiment, the temperature control unit is positioned downstream from the chamber in the ventilation flow. The temperature control unit may include a Peltier element, a heat sink and a fan. More specifically, the Peltier element is disposed downstream in the ventilation flow from the chamber, such that one surface of the Peltier element is placed in surface contact with an exterior surface of the chamber and an opposing surface of the Peltier element is placed in surface contact with the heat sink. A microcontroller and associated circuitry are disposed in the enclosure, wherein the fan generates the ventilation flow through the enclosure, and the microcontroller and associated circuitry are located upstream from the temperature control unit.

In another aspect of this disclosure, the gas chromatography system includes: a chamber; a gas analyzer disposed in the chamber, wherein the gas analyzer includes a detector, a flow rate sensor and a preconcentrator arranged in the same plane of an integrated circuit; and a temperature control unit arranged adjacent to the chamber and configured to control temperature inside the chamber.

The temperature control unit may include a Peltier element, a heat sink and a fan. The Peltier element can be placed in surface contact with an exterior surface of the chamber.

In some embodiments, the gas analyzer is formed by two dies bonded together, where one of the two dies is metallized and the other of the two dies is grooved. Furthermore, the detector is a capacitive detector and the preconcentrator includes a resistive heater.

The gas chromatography system can further comprise a separation column disposed between the flow rate sensor and the detector, where the separation column includes a channel through which gas passes and the channel has a serpentine pattern. The preconcentrator preferably includes a chamber which gas passes through and sorbent granules embedded in the chamber, such that the chamber hosts sorbent granules of at least two types. The separation column may include at least one resistive heating element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
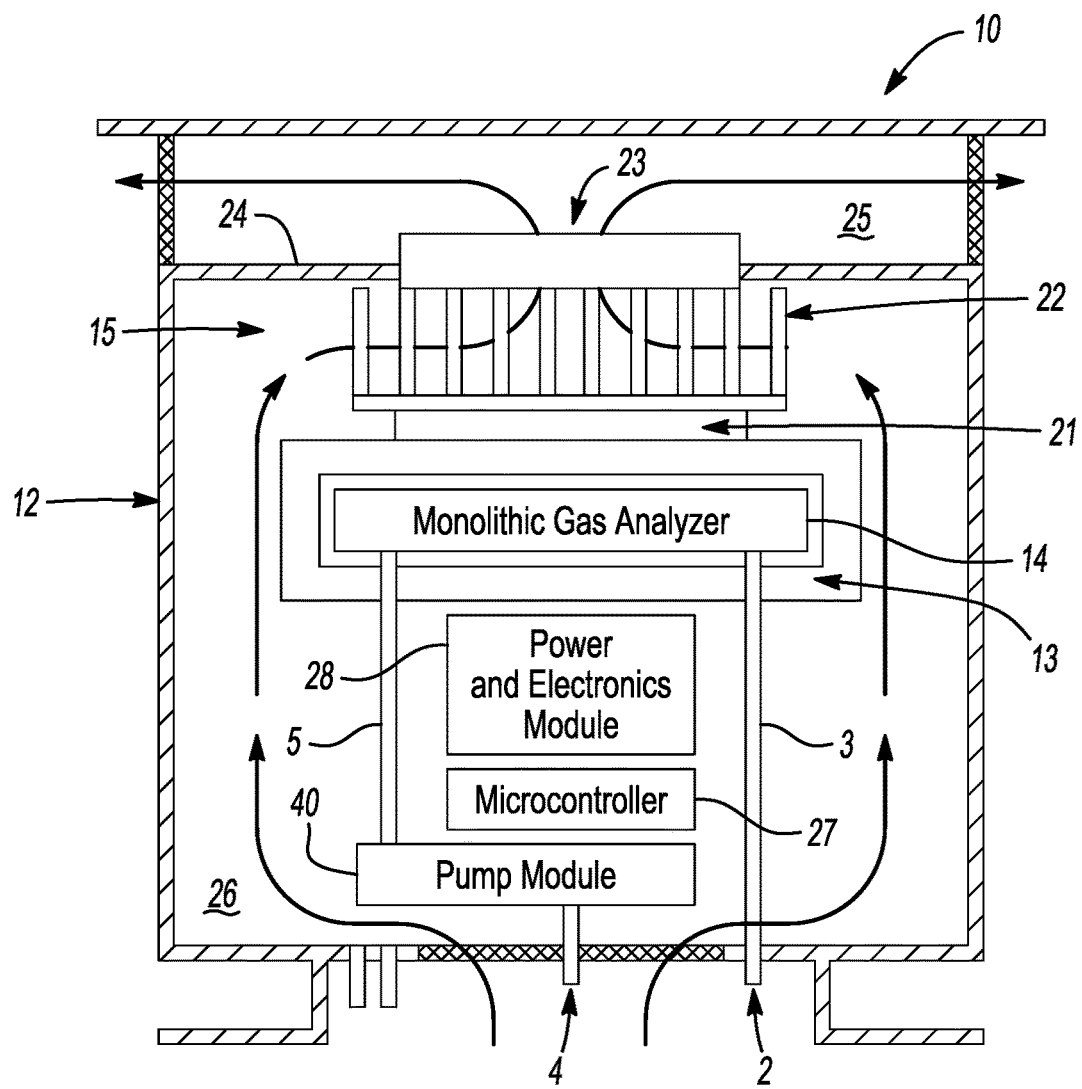
FIG. 1 is a diagram of an example embodiment of a gas chromatography system.

FIG. 1 illustrates an example embodiment for a gas chromatography system 10. The gas chromatography system 10 is comprised generally of an enclosure 12, a temperature controlled chamber 13, a monolithic gas analyzer 14 disposed in the chamber 13 and a temperature control unit 15. The monolithic gas analyzer 14 operates to separate and detect molecules in a gas and the temperature control unit is configured to control temperature inside the chamber 13. Each of these components will be further described below.

In one embodiment, the enclosure 12 is roughly the shape of a cuboid. The enclosure 12 incorporates perforations which allow ventilation flow through the enclosure. In the example embodiment, the enclosure 12 includes an inlet formed in a bottom wall of the enclosure and an outlet formed in the side walls of the enclosure near the top of the enclosure. Ventilation flow is from the inlet to the outlet. The perforations forming the inlet and/or the outlet may be in the form of a fine mesh which prevents rain and debris from entering the enclosure. Other arrangements and implementations for the perforations in the enclosure also fall within the scope of this disclosure. It is noted that the top wall of the enclosure preferably extends beyond the sidewalls of the enclosure which also reduces likelihood of rain or debris from entering the enclosure. The enclosure is also preferably made of a non-outgassing material, such as an uncoated metal or metal alloy, that can accommodate, for extended deployment periods, the necessary range of environmental conditions.

The monolithic gas analyzer 14 is disposed inside a temperature controlled chamber 13. The temperature controlled chamber 13 is a metal box, which is comprised of a base and a top cover. The base incorporates threaded holes within its interior; these are used to attach, using a screw, a circuit board on which the monolithic gas analyzer is mounted. The base also incorporates through-holes on the side wall that allow gas tubing to pass through. The outer surfaces of the temperature controlled chamber 13, except for the area in contact with the Peltier element 21, are covered by a polyimide foam, which provides thermal isolation of the temperature controlled chamber from the ambient. The monolithic gas analyzer 14 may include a detector, a separation column, and a preconcentrator as will be further described below.

A pump module 40 is disposed outside of the chamber 13 but inside the enclosure 12. During a sampling phase, a pump operates to draw the gas in through a sample inlet port 2 and into the chamber 13. During an analytic separation phase, the pump operates to reverse the flow of the gas, such that the gas is drawn into the pump port 4, through the chamber 13 and exhausted out the sample inlet port 2. An inlet conduit 3 extends from the sample inlet port 2 to inside the chamber 13; whereas, an outlet conduit 5 extends between the chamber 13 and the pump port 4. In this way, the gas of interest is delivered from outside the enclosure 12 to the monolithic gas analyzer 14.

Figure 11A:
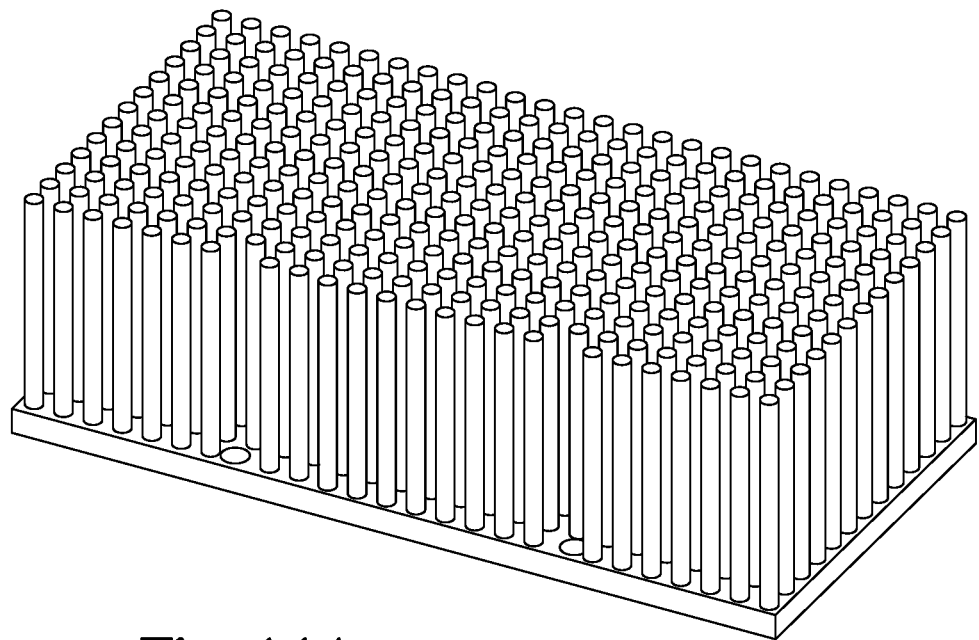
FIGS. 11A-11B are diagrams illustrating an example heat sink.
Figure 11B:
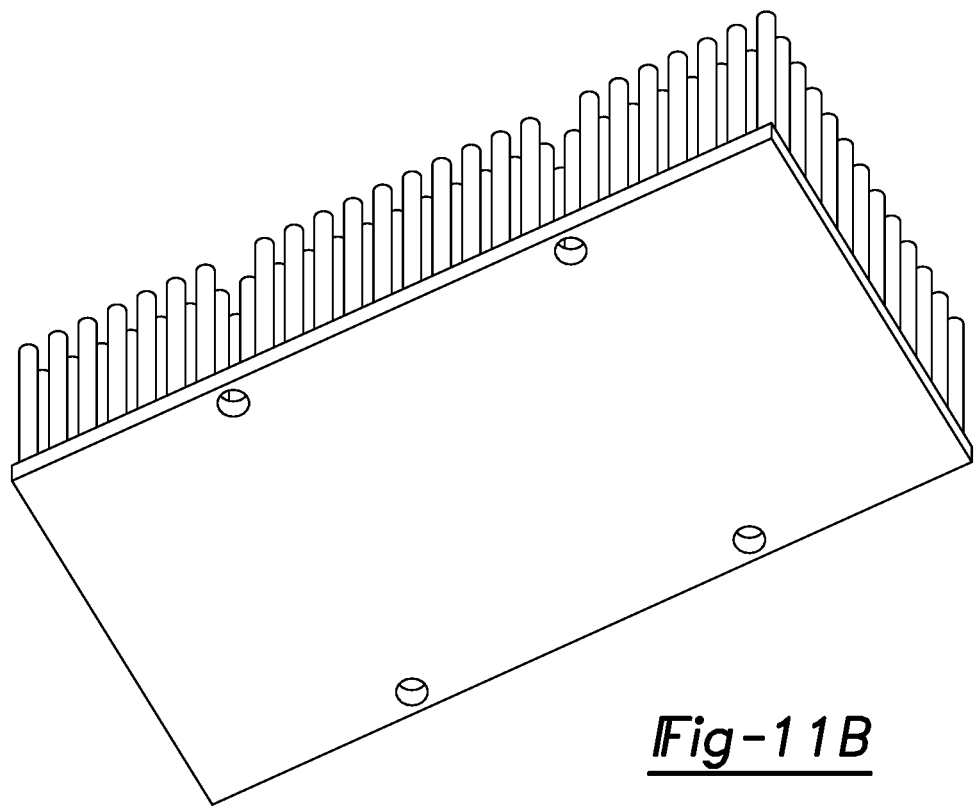

To control temperature in the chamber 13, the temperature control unit 15 is positioned in the enclosure 12 downstream in the ventilation flow from the chamber 13. In the example embodiment, the temperature control unit 15 is placed in physical contact with an exterior top surface of the chamber 13. The temperature control unit 15 includes a Peltier element 21, a heat sink 22 and a fan 23. The heat sink 22 may be made of aluminum and consist of an array of vertical pins on a base plate, for example as seen in FIGS. 11A and 11B. The Peltier element 21 creates a temperature difference between its two surfaces when a current is applied through its two terminals. More specifically, the Peltier element 21 is disposed downstream in the ventilation flow from the chamber 13, such that one surface of the Peltier element is in surface contact with an exterior top surface of the chamber 13 and an opposing surface of the Peltier element 21 is placed in surface contact with the heat sink 22. The fan 23 is placed on top of the heat sink 22 and operates to draw air into the enclosure, thereby creating the ventilation flow. During operation, the ventilation flow created by the fan 23 maintains the heat sink 22 and the top surface of the Peltier element 21 near the ambient temperature. Depending on the direction of the electric current applied to the Peltier element 21, the bottom surface of the Peltier element is either cooled or heated relative to the ambient temperature, thereby controlling the temperature of the temperature controlled enclosure 23. In practice, thermally conductive soft pads may be inserted between the Peltier element 21 and the heat sink 22, and between the Peltier element 21 and the temperature controlled enclosure 23, to compensate for any surface roughness or curvature that might cause an air gap and degrade thermal contact. The fan 23 may be integrated into an inner wall 24 that separates the cavity of the enclosure 23 into an upper and lower compartments 25, 26. The perforations forming the outlet are located adjacent to the upper compartment 25; whereas, the remainder of the system components are located in the lower compartment 26.

The gas chromatography system 10 further includes a microcontroller 27 and associated circuitry 28, including a power module. The gas chromatography system 10 may also include a wireless transceiver and antenna. These components are disposed in the enclosure 12 and are preferably located upstream from the temperature control unit 15. It is to be understood that the most relevant components are discussed in relation to FIG. 1, but that other components may be needed to control and manage the overall operation of the system.

Figure 2:
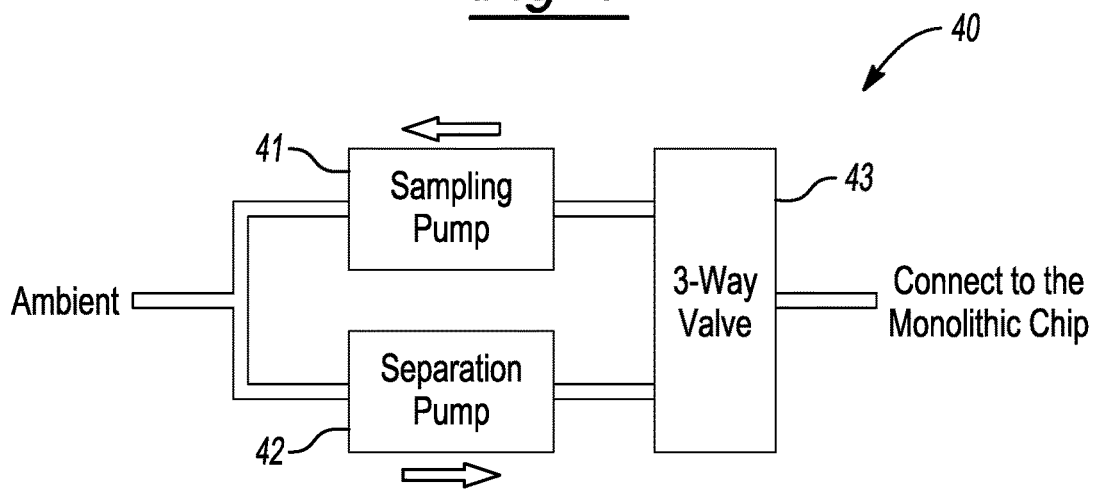
FIG. 2 illustrates an example configuration for a pump module.

The bidirectional pump module 40 is connected to the monolithic gas analyzer 14, to provide flow in one direction for sampling and flow in the opposite direction for separation. In one example embodiment, the bidirectional pump module 40 is comprised of a sampling pump 41, a separation pump 42, and a three-way valve 43 as seen in FIG. 2. The sampling pump 41 may be a miniature uni-directional diaphragm pump that provides a relatively high flow rate for fast sampling. The separation pump 42 may be a miniature uni-directional diaphragm pump that provides a relatively low but well controlled and tunable flow rate for separation. The three-way valve 43 may be used to select between the two flow directions. In another example embodiment, a bidirectional Knudsen pump may be used to drive a gas of interest (i.e., carrier gas and the sample) through the system. Further information for an example bidirectional Knudsen pump is described by Q. Cheng, et. al. in "A Bidirectional Knudsen pump with Superior Thermal Management for Micro-Gas Chromatography Applications," *IEEE International Conference on Micro Electro Mechanical Systems (MEMS)*, Las Vegas, Nevada, January 2017 which is incorporated by reference in its entirety.

Figure 3:
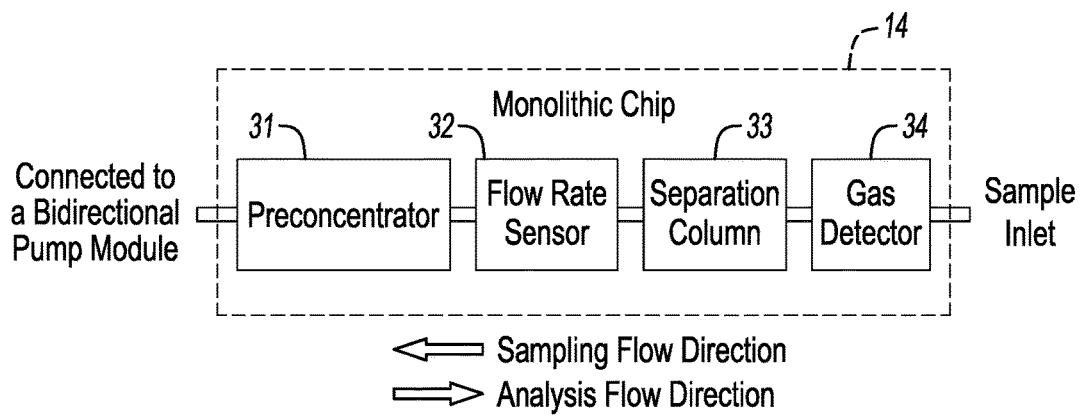
FIG. 3 is a block diagram for a monolithic gas analyzer.
Figure 4:
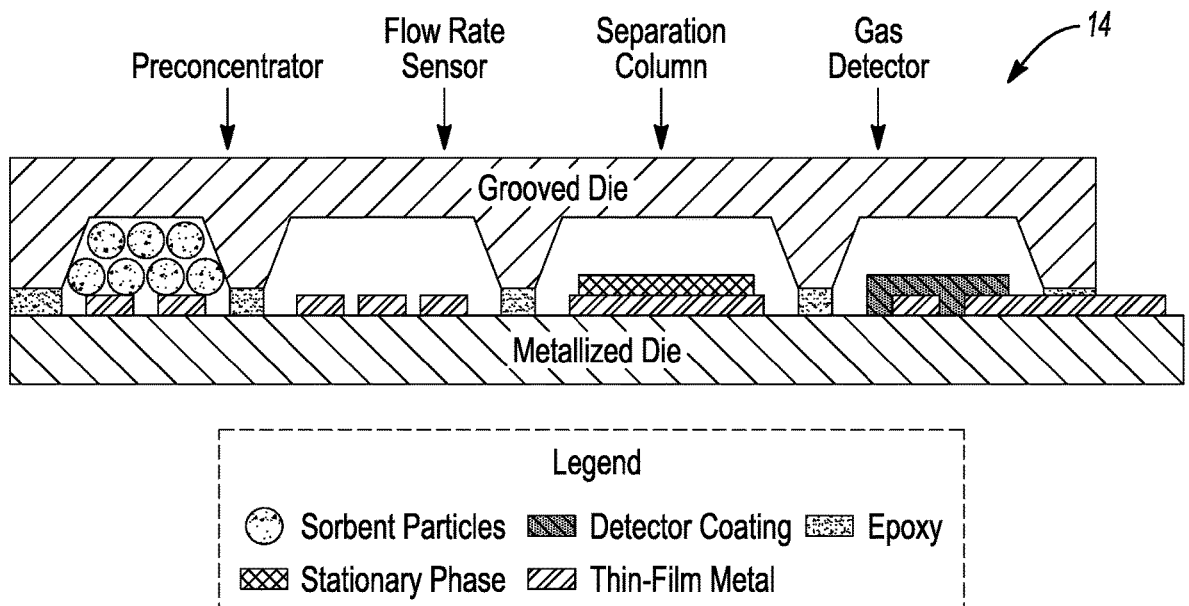
FIG. 4 illustrates an example embodiment of a monolithic gas analyzer.

FIGS. 3 and 4 further illustrate the monolithic gas analyzer 14. In one embodiment, the gas analyzer 14 is formed by two dies bonded together as seen in FIG. 4. One of the dies is metallized while the other die is grooved. For the metallized die, the metal can be formed by evaporation, sputtering, electroplating, inkjet printing, or direct metal laser sintering. For the grooved die, the grooves can be formed by plasma etching, wet etching, sandblasting, ultrasonic machining, or laser machining. The bonding of the two dies can be performed by anodic bonding, fusion bonding, chemical bonding, or adhesive bonding. An intermediate layer may be used to facilitate the bonding. The coating of the stationary phase in the separation column and the polymer in the detector can be performed using static coating, dynamic coating, chemical vapor deposition, inkjet printing, stamping, spin-coating, or spray-coating.

The monolithic gas analyzer 14 includes a preconcentrator 31, a flow rate sensor 32, a separation column 33 and a gas detector 34. During operation, the separation column 33 is configured to receive the gas of interest and operates to separate analyte molecules from the gas. The preconcentrator 31 adsorbs the analyte molecules prior to analysis by the separation column 33. To initiate analysis, the sample is desorbed with a thermal pulse and injected into the fluidic path. During the analytic separation phase, the detector 34 receives the sample from the separation column 33 and operates to quantify select species in the sample. Each of these components is described in more detail below.

The preconcentrator 31 adsorbs the analyte molecules onto a porous surface at room temperature. To initiate analysis, the sample is desorbed with a thermal pulse and injected into the fluidic path. The example embodiment utilizes a two-bed preconcentrator, designed as a sorbent chamber having a volume of 3.5 mm³. Granules of two types of graphitized carbon with surface areas of 100 m²/g and 240 m²/g, respectively, are packed in the sorbent chamber as the sorbent material. In addition to the gas inlet and outlet features, the preconcentrator 31 contains a sorbent loading port from which the sorbent granules can be loaded. The arrays of pillars are incorporated within the sorbent chamber to confine the sorbent granules in. Other types of sorbent materials are contemplated by this disclosure.

The theoretical modeling of the sorbent-packed preconcentrators is often described using the Wheeler-Jonas model. The breakthrough time $t_b$ (min.) is a metric for the adsorption capability. Specifically, it is the time required for vapor that enters the preconcentrator 31 to saturate the preconcentrator and reach a certain concentration at the outlet of the preconcentrator (expressed as a fraction of that at the inlet):

$$t_b = \frac{w_e}{Q \cdot c_{in}} \left[ W - \frac{Q \cdot \rho_b}{k_v} \ln\left(\frac{c_{in}}{c_{out}}\right) \right] \tag{4}$$

where $W_e$ is the adsorption capacity that can be theoretically derived, $W$ is the total sorbent mass (g), $Q$ is the volumetric flow rate (cm³/min.), $c_{in}$ is the inlet chemical concentration (g/cm³), $\rho_b$ is the bulk density of the packed sorbent (g/cm³), $k_v$ is the overall mass transfer coefficient (min.⁻¹) that can be estimated from semi-empirical equations, and $c_{out}$ is the outlet chemical concentration chosen to denote breakthrough (g/cm³).

Figure 5:
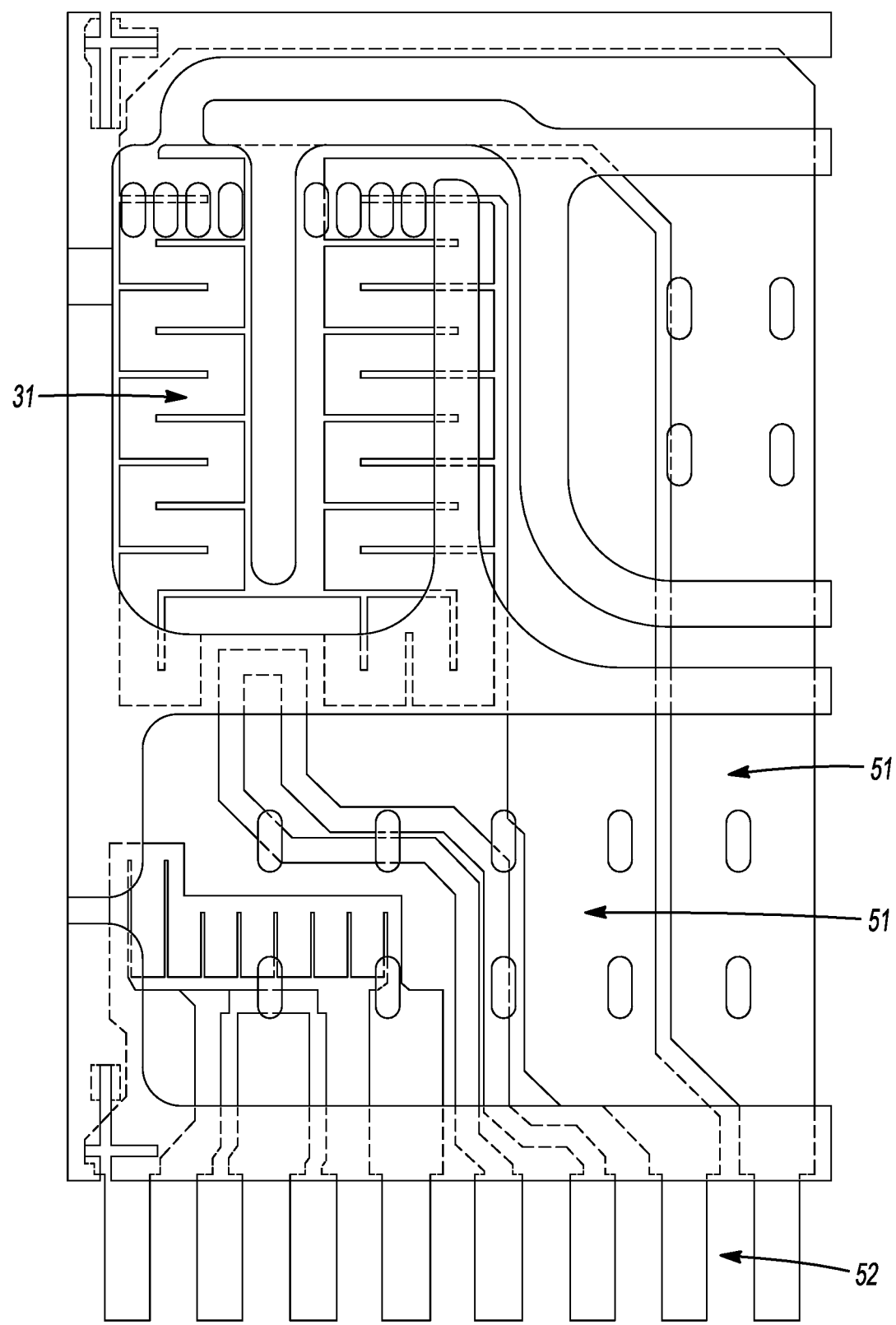
FIG. 5 depicts a heater design for a preconcentrator.

With reference to FIG. 5, the preconcentrator 31 incorporates a U-shape chamber that contains the sorbent particles in one embodiment. During desorption, the entire sorbent chamber is uniformly heated to 200-250° C. Because the sorbent chamber is located near the upper left corner of the chip, which is suspended above the PCB, heating with a uniform temperature requires a non-uniform input power distribution, i.e., the lower and right regions of the preconcentrator require larger power density. This is provided by designing the heater to extend beyond the lower and right boundaries of the sorbent chamber. As shown by simulation, the heater is able to provide a uniform temperature over the entire sorbent chamber. In addition, because the preconcentrator 31 is relatively distant (≈1 cm) from the other GC elements, the thermal crosstalk between these elements is reduced. The metal traces 51 connecting the lead pads 52 to the heated area are designed to be wide enough to minimize the parasitic resistance.

In one example embodiment, the monolithic gas analyzer chip is mounted on a glass spacer, which suspends the preconcentrator 1 mm above the circuit board and provides mechanical support to the rest of the chip.

The separation column 33 separates analyte species as they pass along, based on the partition that each analyte establishes between the mobile phase (carrier gas) and the stationary phase. In one embodiment, the column 33 is designed as a channel (length ≈60 cm) laid out in a serpentine pattern. The manufacturing process creates an approximately semi-elliptical cross section (width ≈500 μm, depth ≈180 μm). A non-polar polydimethylsiloxane layer is coated on the inner walls as the stationary phase.

Figure 6:
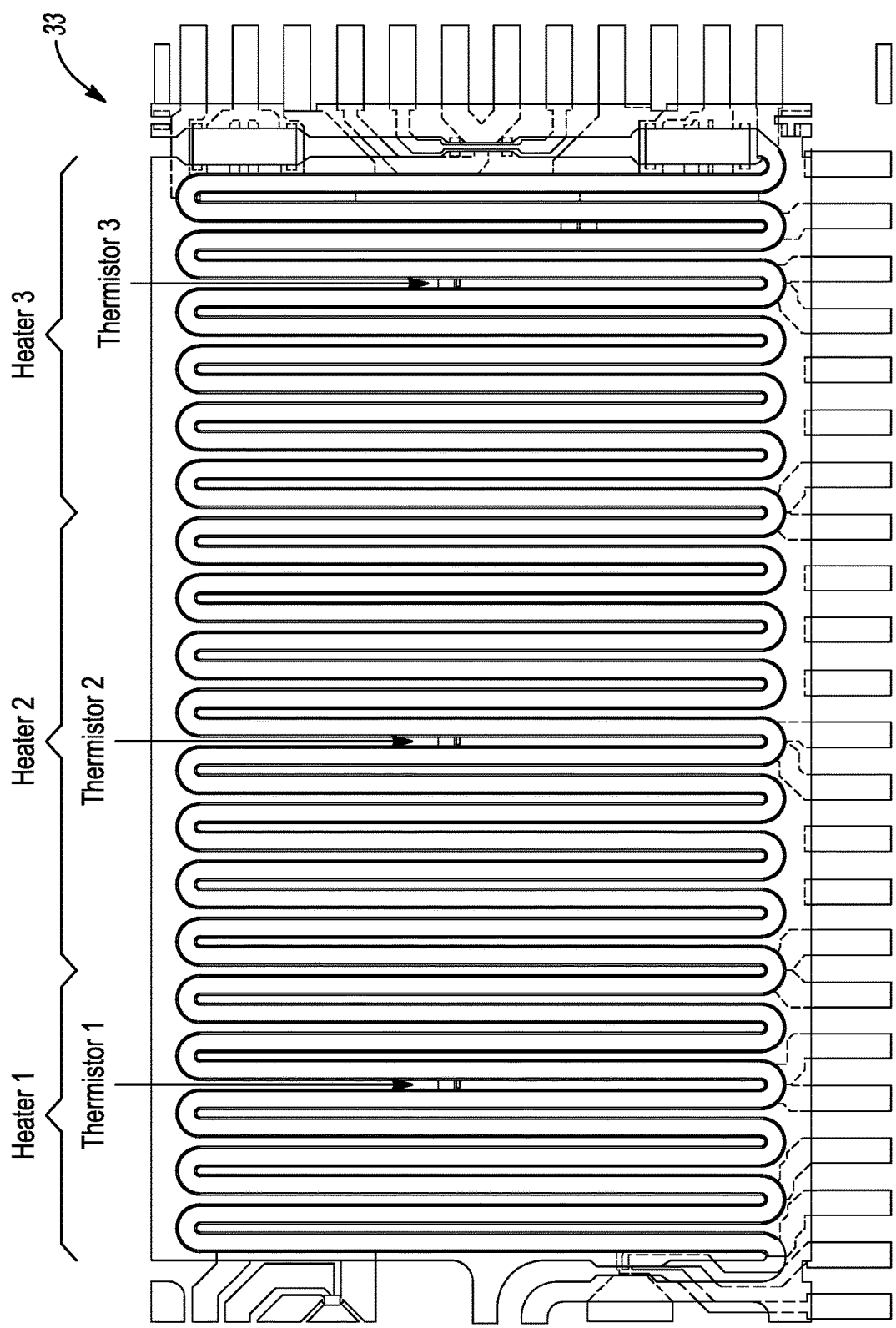
FIG. 6 depicts a heater design for a separation column.

The separation efficiency of a chromatography column can be evaluated from experimentally obtained chromatograms. Higher separation efficiency is denoted by higher number of plates, as well as smaller dimension of a theoretical plate, termed the "height equivalent to a theoretical plate (HETP)." The HETP can be theoretically estimated from the structural dimensions and physical properties of the column, although these are not always well known. The HETP of the column can be calculated accordingly, which facilitates the evaluation and comparison of columns with various lengths.

$$N = 5.54\left(\frac{t_R}{W_{1/2}}\right)^2 \quad (5)$$

$$HETP = \frac{l_{column}}{N} \quad (6)$$

where $t_R$ is the retention time, $W_{1/2}$, is the width of the retention peak measured at half height, and $l_{column}$ is the length of the separation column. A heater design for the separation column 33 is shown in FIG. 6. Because of the large area of the separation column, it is separated into three regions, each region being controlled by a heater and a thermistor. The heater patterns for the separation column spans over the entire area of the separation column to provide uniform heating. The heater patterns for the separation column is designed to be enclosed within the flow channel, and follow the meandering pattern of the flow channel.

In the example embodiment, the gas detector 34 is a capacitive detector, which is a capacitor formed by an array of interdigitated metal electrodes on a fused silica substrate that are covered by a layer of vapor sensitive polymer. Upon localized vapor absorption, the polymer undergoes swelling and change in the dielectric constant, thereby generating a change in the capacitance that can be read out by electronic circuits. In one example, the metal electrodes consist of layers of thin-film metal. The electrodes have a width of 0.1-5 μm and an inter-electrode gap of 0.1-5 μm. The vapor sensitive polymer is polydimethylsiloxane. To enhance chemical recognition and identification, the monolithic gas analyzer may integrate multiple complementary capacitive detectors, each of which having a unique combination of the material and the thickness of the vapor sensitive polymer.

Figure 7:
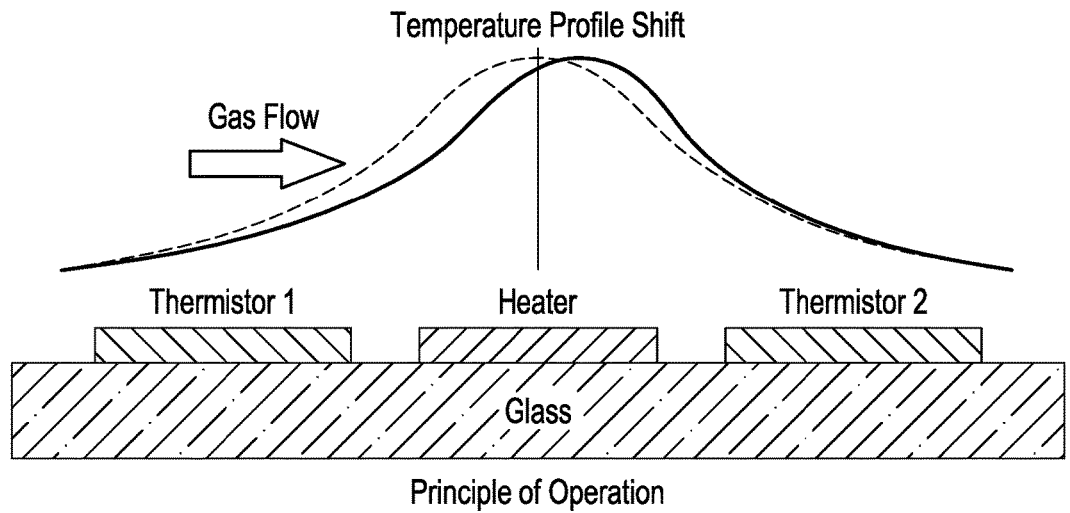
FIG. 7 is a diagram illustrating the principle of operation for a flow rate sensor.
Figure 8:
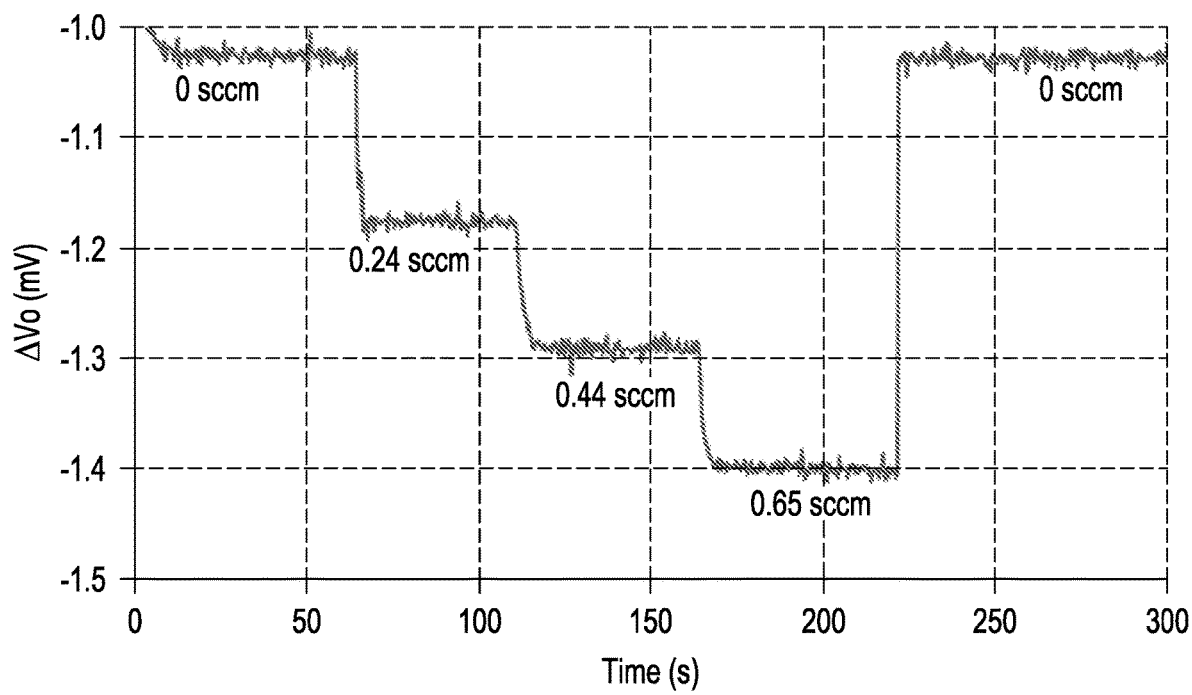
FIG. 8 is a graph showing response for the flow rate sensor.

FIG. 7 illustrates the principle of operation for the flow rate sensor 32. In this example, the flow rate sensor 32 includes a heater and two thermistors along the gas flow path. The two thermistors are equidistant from the heater, and located upstream and downstream of it. In the absence of flow, the heater creates a temperature distribution profile that is symmetric around the center causing the thermistors to present matching responses. In the presence of gas flow, the temperature profile is shifted downstream, increasing the temperature of downstream thermistor while decreasing the temperature of the upstream thermistor. A circuit can be used to read out the differential voltage output of the two thermistors. The sensor response to flow rate is shown in FIG. 8.

Figure 9:
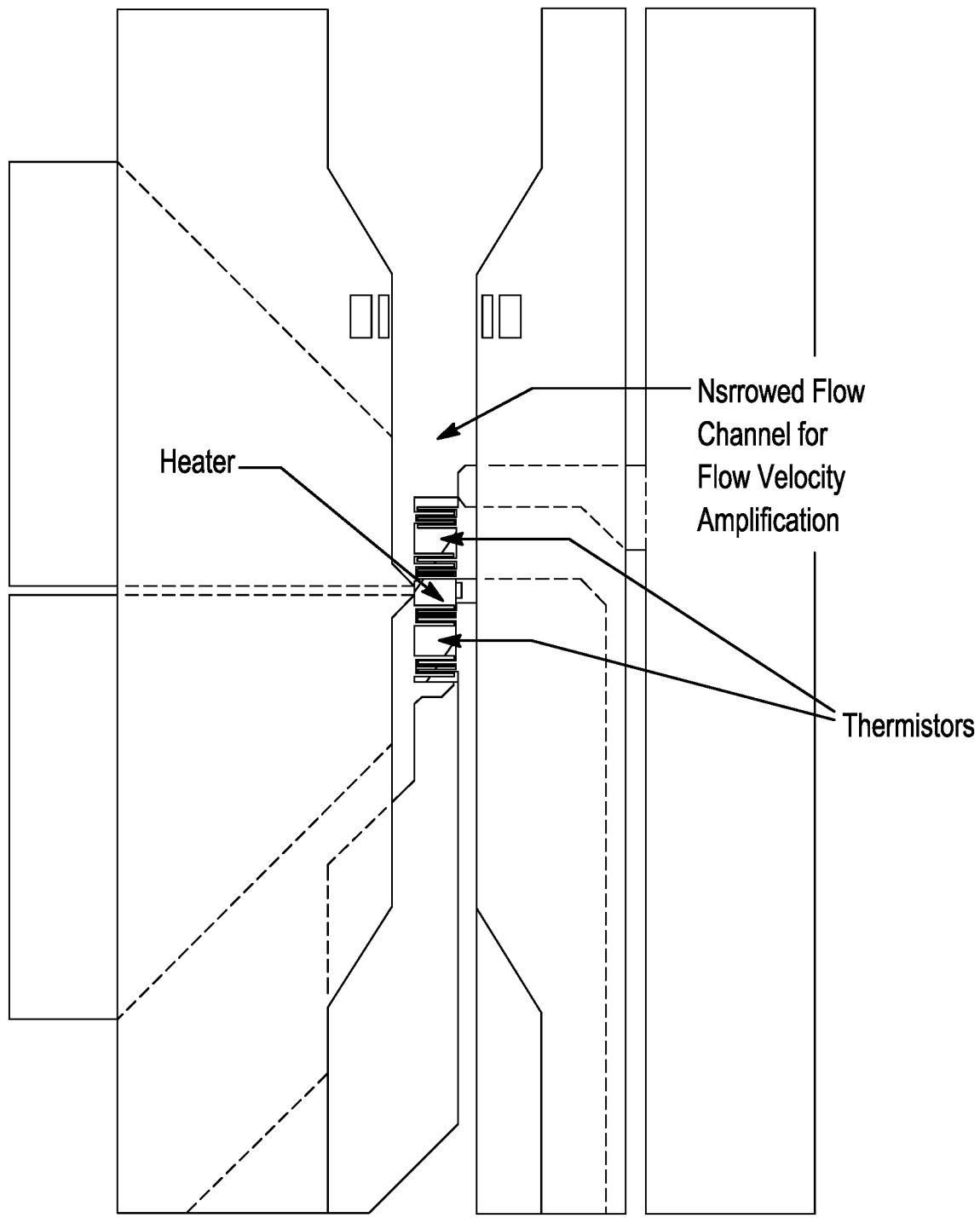
FIG. 9 is a diagram illustrating the layout for a flow rate sensor.

With reference to FIG. 9, the sensitivity of a flow rate sensor 32 depends on the flow velocity. Within an integrated fluidic system, the flow rate is determined by the pump and the entire flow resistance of the system. For a given flow rate, the flow velocity through the sensor can be increased by narrowing the flow channel, thereby improving the sensitivity. In an example embodiment, the majority of the flow channels may have a 500 μm width, whereas that of the flow rate sensor may be reduced to a 200 μm width.

Figure 10A:
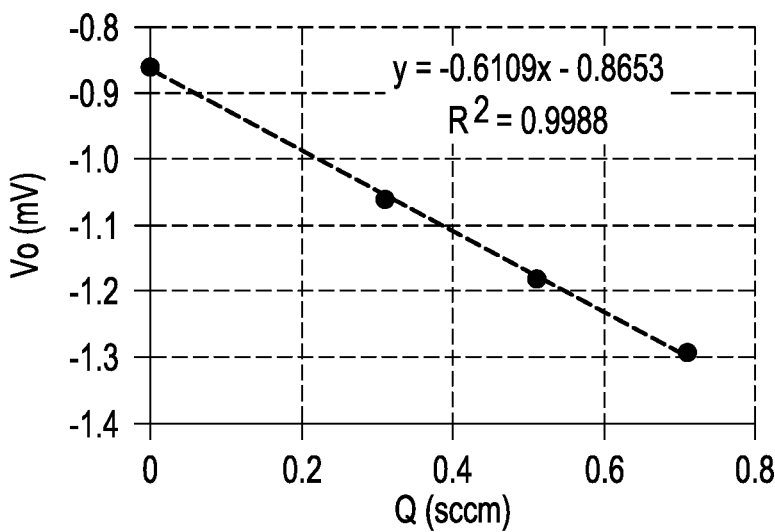
FIGS. 10A-10C are graphs showing the calibrated sensitivity of the flow rate sensor.
Figure 10B:
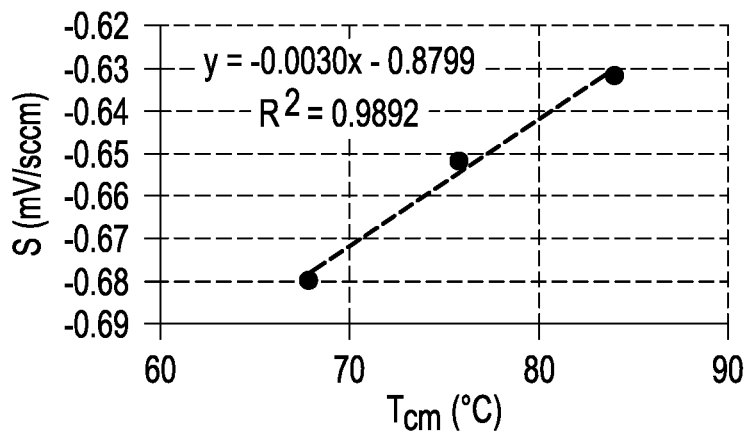
Figure 10C:
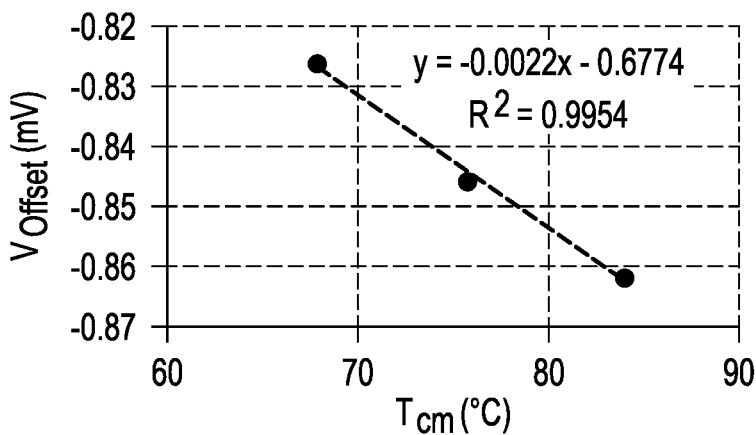

To enable flow rate measurement over a range of operating temperatures, the flow rate sensor 32 is calibrated at three different temperatures. The differential output voltage of the two thermistors is the flow rate sensor output ($V_O$). The temperature of the flow rate sensor is the common-mode temperature of the two thermistors ($T_{cm}$). At each temperature $T_{cm}$, the $V_O$ and input flow rate Q can be approximated by a linear relationship: $V_O = S \cdot Q + V_{offset}$ as seen in FIG. 10A, where S is the sensitivity, and $V_{offset}$ is the output voltage offset (i.e., output voltage at zero input flow rate). Over a range of calibrated temperatures, the sensitivity S forms a linear relation with the temperature: $S = \beta_{sen.1} \cdot T_{cm} + \beta_{sen.0}$ as seen in FIG. 10B. Over a range of calibrated temperatures, the sensitivity S forms a linear relation with the temperature: $V_{offset} = \beta_{offset.1} \cdot T_{cm} + \beta_{offset.0}$ as seen in FIG. 10C. The coefficients $\beta_{sen.0}$, $\beta_{sen.1}$, $\beta_{offset.0}$, and $\beta_{offset.1}$ are the extracted calibration results used to calculate S and $V_{offset}$ at any temperature $T_{cm}$ during operation, which are further used to calculate the flow rate:

$$Q = \frac{V_O - V_{offset}}{S} \quad (7)$$

In this way, the flow rate sensor 32 can be calibrated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A gas chromatography system, comprising:
   an enclosure having an inlet and an outlet, such that ventilation flow is from the inlet to the outlet;
   a chamber disposed in the enclosure;
   a monolithic gas analyzer disposed in the chamber and operates to separate and detect molecules from a gas; and
   a temperature control unit disposed in physical contact with the chamber and configured to control temperature inside the chamber, where the enclosure includes a partition which separates the temperature control unit from the outlet.

2. The gas chromatography system of claim 1 wherein the monolithic gas analyzer includes:
   a detector having an inlet to receive the gas;
   a separation column fluidly coupled to the detector and configured to receive the gas from the detector and operates to separate molecules from the gas; and
   a preconcentrator fluidly coupled to the separation column.

3. The gas chromatography system of claim 2 wherein the monolithic gas analyzer further includes a flow rate sensor interposed between the separation column and the preconcentrator.

4. The gas chromatography system of claim 2 further comprises a pump disposed outside of the chamber but inside the enclosure, wherein, during a sampling phase, the pump operates to draw the gas into the inlet of the detector, such that the gas passes through the separation column and into the preconcentrator and, during an analytic separation phase, the pump operates to reverse the flow of the gas, such that the gas moves from the preconcentrator through the separation column and into the detector.

5. The gas chromatography system of claim 4 further comprises an inlet conduit extending from inside the chamber to the inlet of the enclosure and an outlet conduit extending between the chamber and the pump.

6. The gas chromatography system of claim 2 wherein the temperature control unit is positioned downstream from the chamber in the ventilation flow.

7. The gas chromatography system of claim 2 wherein the temperature control unit includes a Peltier element, a heat sink and a fan.

8. The gas chromatography system of claim 7 wherein the Peltier element is disposed downstream in the ventilation flow from the chamber, such that one surface of the Peltier element is placed in surface contact with an exterior surface of the chamber and an opposing surface of the Peltier element is placed in surface contact with the heat sink.

9. The gas chromatography system of claim 8 further comprises a microcontroller and associated circuitry disposed in the enclosure, wherein the fan generates the ventilation flow through the enclosure, and the microcontroller and associated circuitry are located upstream from the temperature control unit.

10. The gas chromatography system of claim 1 wherein the enclosure is comprised of metal.

11. A gas chromatography system, comprising:
    a chamber;
    a gas analyzer disposed in the chamber, wherein the gas analyzer includes a detector, a flow rate sensor and a preconcentrator arranged in the same plane of an integrated circuit;
    a temperature control unit arranged adjacent to the chamber and configured to control temperature inside the chamber; and
    a pump disposed outside of the chamber, wherein, during a sampling phase, the pump operates to draw gas into an inlet of the detector, such that the gas passes through the detector and into the preconcentrator and, during an analytic separation phase, the pump operates to reverse the flow of the gas, such that the gas moves from the preconcentrator and into the detector.

12. The gas chromatography system of claim 11 wherein the temperature control unit includes a Peltier element, a heat sink and a fan.

13. The gas chromatography system of claim 12 wherein the Peltier element is placed in surface contact with an exterior surface of the chamber.

14. The gas chromatography system of claim 11 wherein the gas analyzer is formed by two dies bonded together, where one of the two dies is metallized and the other of the two dies is grooved.

15. The gas chromatography system of claim 11 wherein the detector is a capacitive detector and the preconcentrator includes a resistive heater.

16. The gas chromatography system of claim 11 further comprises a separation column disposed between the flow rate sensor and the detector, wherein the separation column includes a channel through which gas passes and the channel has a serpentine pattern.

17. The gas chromatography system of claim 16 wherein the separation column includes at least one resistive heating element.

18. The gas chromatography system of claim 11 wherein the preconcentrator includes a chamber which gas passes through and sorbent granules embedded in the chamber, such that the chamber hosts sorbent granules of at least two types.

* * * * *